United States Patent
El-Sobky

[11] Patent Number: 5,648,104
[45] Date of Patent: Jul. 15, 1997

[54] EXTRUSION DIE

[75] Inventor: Hobab El-Sobky, Stockport, England

[73] Assignee: The University of Manchester Institute of Science and Technology, Manchester, England

[21] Appl. No.: 434,324

[22] Filed: May 2, 1995

Related U.S. Application Data

[63] Continuation of Ser. No. 90,030, filed as PCT/GB92/00098, Jan. 17, 1992, published as WO92/12840, Aug. 6, 1992, abandoned.

[30] Foreign Application Priority Data

Jan. 17, 1991 [GB] United Kingdom ............... 9101050

[51] Int. Cl.$^6$ ............................................ B29C 47/24
[52] U.S. Cl. ............ 425/131.1; 425/380; 425/381; 425/462; 425/467; 264/108; 264/209.2; 264/209.8
[58] Field of Search ............... 264/108, 209.2, 264/209.8; 425/131.1, 380, 381, 462, 467, 133.1

[56] References Cited

U.S. PATENT DOCUMENTS

| | | | |
|---|---|---|---|
| 3,069,724 | 12/1962 | Schiedrum | 425/380 |
| 3,856,447 | 12/1974 | Schwiesser | 425/114 |
| 4,082,597 | 4/1978 | Drostholm | 156/429 |
| 4,156,587 | 5/1979 | Christian | 425/467 |
| 4,185,951 | 1/1980 | Webermeier et al. | 425/462 |
| 4,201,532 | 5/1980 | Cole | 425/380 |
| 4,687,430 | 8/1987 | Morris | 425/133.1 |
| 5,069,612 | 12/1991 | Teutsch et al. | 425/133.1 |
| 5,114,215 | 5/1992 | Hirschberger | 425/466 |
| 5,116,215 | 5/1992 | Hsu | 425/466 |
| 5,132,549 | 7/1992 | Allan et al. | 425/327 |
| 5,154,865 | 10/1992 | Dinter | 264/108 |

FOREIGN PATENT DOCUMENTS

| | | | |
|---|---|---|---|
| 1142840 | 11/1957 | Germany . | |
| 2948032 | 6/1981 | Germany | 425/380 |
| 3824757 | 2/1989 | Germany . | |
| 43-20772 | 6/1968 | Japan | 425/380 |
| 88/04228 | 6/1988 | WIPO . | |

*Primary Examiner*—Khanh P. Nguyen
*Attorney, Agent, or Firm*—Hickman Beyer & Weaver

[57] ABSTRACT

An extrusion die for the extrusion of continuous hollow sections of plastic materials reinforced with fibers or molecules. Both the outer nozzle and inner mandrel are rotatable and have channels within them to allow the extrudate to flow through either the body of the nozzle or of the mandrel into the space between them to impart a radial component to the fibers. Likewise, a helical channel formed in either the nozzle or mandrel imparts a tangential component to the fibers. The flow may also be straight through the die which gives the fibers an axial component.

16 Claims, 22 Drawing Sheets

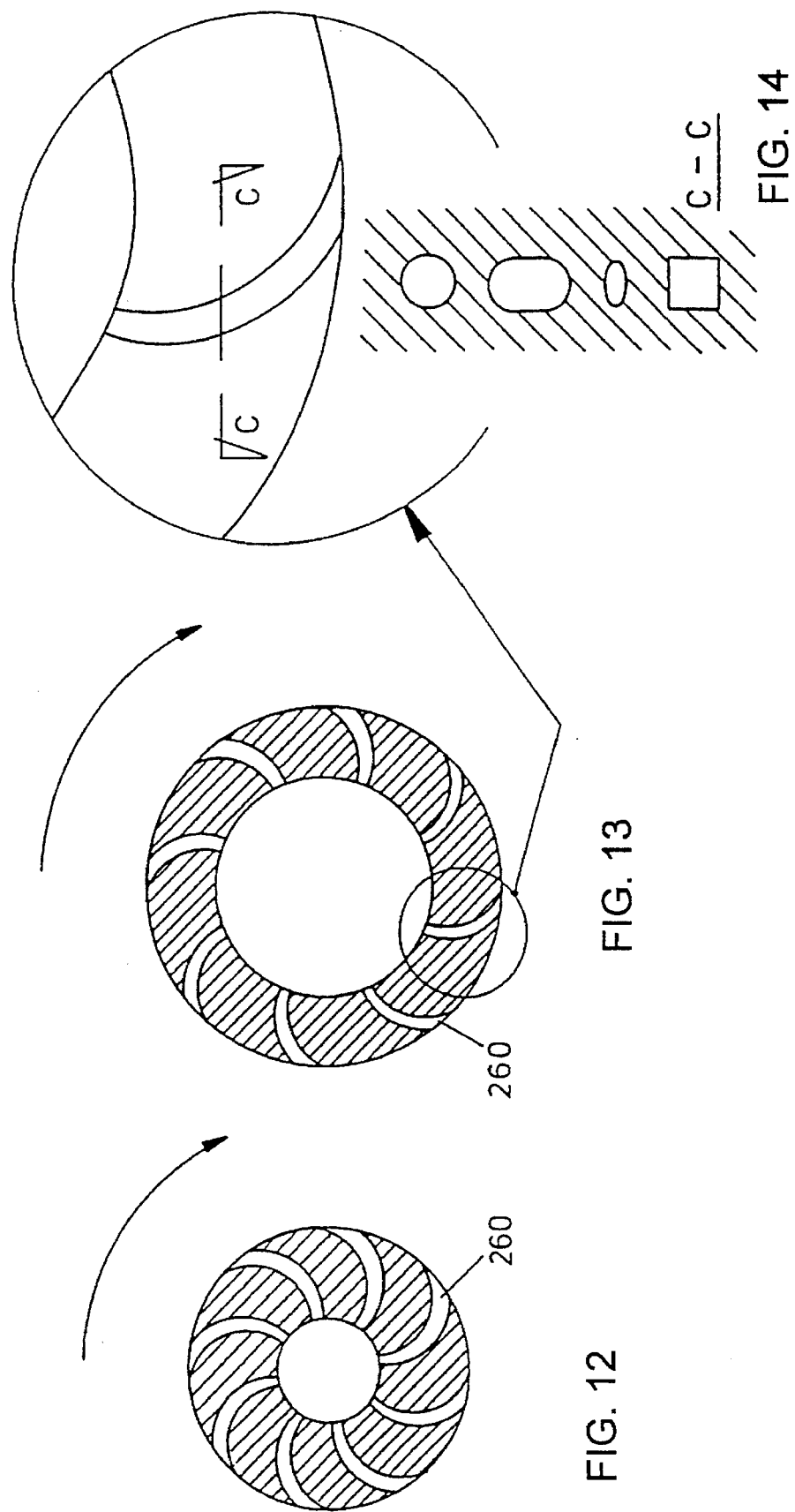

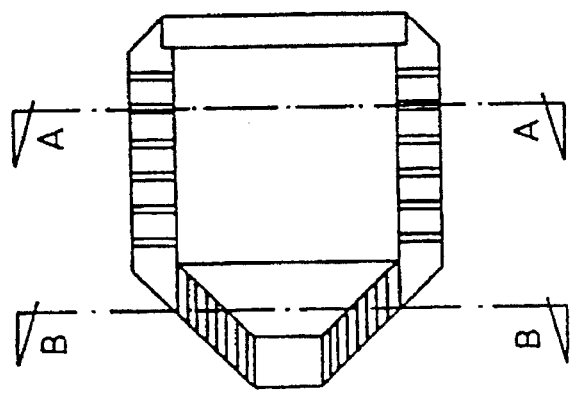
FIG. 16
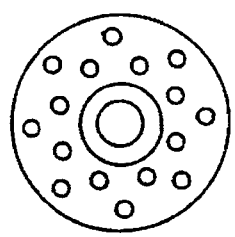
B - B
FIG. 15B
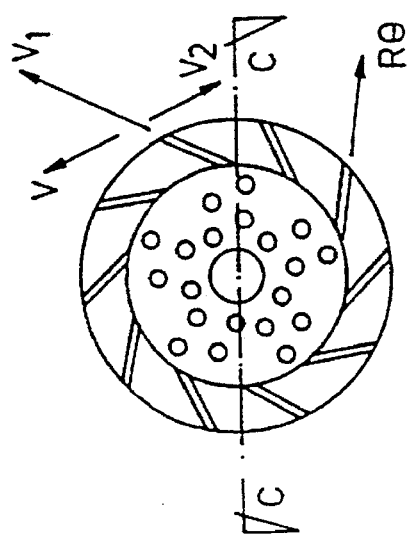
A - A
FIG. 15A
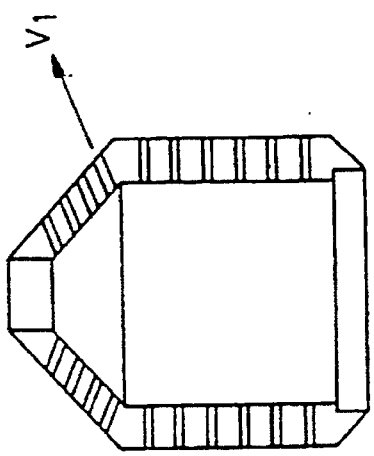
C - C   FIG. 17

EXTRUSION DIE

This is a continuation of application Ser. No. 08/090,030, filed as PCT/GB92/00098, Jan. 17, 1992 published as WO92/12840, Aug. 6, 1992, now abandoned.

This invention relates to an intrusion die for the extrusion of continuous sections such as hollow pipes or shafts made from plastics materials, or fibre or molecular reinforced plastics, and to a hollow section formed from the extrusion die.

Known extrusion dies comprise an inner die member and a substantially coaxial outer die member, spaced apart from the inner die member. A hollow section may be formed by extruding the material through the space between the inner and outer die members in an axial direction.

A problem encountered when extruding hollow sections is that the molecules or fibres in the extrusion material tend to align along the direction of flow of the extruded material. This results in an overall improvement in the strength of the pipe but the strengthening effect is greater in the axial direction than in the hoop direction where the stresses are actually much higher when the pipe is internally pressured. The reverse would be more desirable, i.e. to gain most of the improvement in the hoop direction where it is needed more.

A known method of extruding hollow sections comprises rotating the members of the die while extrusion takes place through the die. It is known to rotate both the inner and the outer die member, or to rotate only the inner member. Although these known methods and dies go some way to increasing the hoop strength of the extruded hollow sections, they are not easily adapted for use with conventional cooling and haul-off devices, normally located downstream of the mouth of a conventional non-rotating die. Also, at least one surface of the extruded pipe may tend still to possess some component of rotary motion at the moment that it comes into contact with such devices, which leads to rough surfaces and periodical variation in the pipe thickness.

Another known extrusion die described in British Patent No. 2096533 comprises an extrusion die having a rotation section comprising an inner die member, and an inner stationary section positioned at an end of the rotating die member. The inner member may be rotatable. This extrusion apparatus allows the extrudate to emerge from the die mouth without rotational speed, and improves the compatibility of the die with the conventional cooling and haul-off devices. It also allows extrudate to emerge from the die mouth in a stable manner without rotational speed.

Another problem which exists in conventional dies is that lines of weakness exist in the extruded section, due to the existence of support members known as a spider which support the inner die member in position.

A known extrusion die which attempts to overcome this problem comprises an inner substantially cylindrical die member and an outer die member. Neither the inner nor the outer member can rotate. The inner surface of the outer die member is formed into a helical channel separated axially by lands and which form a continuous spiral from one end of the outer member to the other. The channel extends radially into the outer member from the inner surface. The inner and outer members are dimensioned such that the lands on the inner surface of the outer die member are in contact with the outer surface of the inner die member. Thus a gap is defined between the two die members which comprises a helical channel running circumferentially from one end of the die to the other. In use, the extruding material travels down the helical channel, and emerges into a channel defined between two stationary members.

A problem with this known die, is that the resulting extruded section is effectively formed from a continuous rod like length of extruded material helically wrapped around the mould and which was formed by the helical channels of the die.

Another problem with known extrusion dies is that it is not possible to completely control the orientation of molecules or fibres in the extruded section, for example, it is not possible to control the orientation of fibres or molecules in the radial direction.

According to a first aspect of the invention, there is provided, an extrusion apparatus for extruding material along an extrusion direction comprising:

an orientation control section having an outer member having an axis extending in the direction of extrusion, and having a first surface defining a space;

an inner member, positioned within the space coaxially with the outer member and having a second surface which is spaced apart from the surface of the outer member, characterised in that one of the first and second members comprises a channel formation and in that the inner and outer members are dimensioned such that the first and second surfaces are radially spaced apart from one another.

Thus, in the extrusion apparatus of the present invention, a space is defined between the inner member and the outer member which comprises a generally annular space having a channel formation in one member.

The channel formation may comprise a single channel extending helically along the length of the respective member and separated axially by lands formed on the surface of the respective member, and the inner and outer member being dimensioned such that the lands are radially spaced apart from one another.

The dimensions of the annular space may be substantially constant along the length of the member or one or both of the inner and outer members may be shaped such that the dimensions of the annular space are not constant, but vary along the length of the orientation section. In other words, the separation of the inner and outer members may vary along the length of the members. The variation may be such as to increase or decrease the radial dimensions of the annular space in a particular direction. The depth or geometry of the helical channel may be constant along the length of the member, or alternatively, the depth or geometry of the channel may vary along the length of the members, independently of any variation in the dimensions of the annular space.

The channel may be formed on the surface of either the inner member of the outer member, but preferably a channel is formed on the surface of both members. The inner and outer members may both be stationary during extrusion, or one or both members may rotate during extrusion. When only one member has a channel formed in its surface, it is preferable that only one member rotates duping extrusion, relative to the outer member.

Alternatively, the channel may be formed within one or both of the members, and may have any appropriate cross-section.

Advantageously, if only one member rotates, the channel is formed on the surface of the rotating member.

Preferably the channel is formed in the inner member. Alternatively, the inner member is hollow, and the channel formation comprises a plurality of separate channels, the centre lines of which all lie in a plane and extend from an outer surface to an inner surface of the respective member.

The channels thus extend completely through the thickness of the inner member. The channels may be made small enough to produce tiny streams of extrudate material flowing like strands of highly sheared and highly oriented spun fibres. These conditions can be similar to those used in synthetic fibre spinning from melts.

The centre lines of the channels may all lie in a plane which is perpendicular to the axis of the members, or any other angle relative to the axis of the members.

The cross-sectional shape of the channels may have any desirable shape, for example circular, square, rectangular etc.

Advantageously, the channels lie in parellel planes spaced apart along the length of the respective member, each plane containing one or more channels. Each channel may be straight, or may be formed curved along its length.

Conveniently the extrusion apparatus further comprises an exit portion positioned downstream of the orientation control section, and comprising a fixed outer exit member substantially coaxial with the members of the extrusion portion, and defining a substantially cylindrical space, and a substantially cylindrical fixed inner exit member positioned substantially coaxially with the outer exit member and forming a substantially annular space between the inner and outer members.

The extrudate thus emerges from the orientation control section into the stationary exit portion. This improves the compatibility of the extrusion apparatus with conventional cooling and haul-off devices.

The gap defined by the inner and outer members of the orientation control section may be of constant radial width along the length of the section. Alternatively the gap can have a tapered radial width along the length of the section, to gradually bring it to the same width as that of the gap in the exit portion. When each member is formed with a helical channel, both channels may be helical in the same sense, i.e. both clockwise, or both anticlockwise. Alternatively, the channels may have different senses ie one clockwise and one anticlockwise. The same applies to the direction of rotation.

According to a second aspect of the invention, there is provided a hollow extruded plastics section comprising molecules or fibres embedded in a plastics material in which the orientation of the molecules or fibres may have any predetermined angle in three dimensional space.

A hollow section according to the second aspect of the invention may be formed using an extrusion die according to the first aspect of the invention, in which one or both of the inner and outer members is hollow, and the channel formation comprises a plurality of separate channels, the centre lines of which all lie in a plane and extend from an outer to an inner surface of the respective member.

The section so formed will be continuous and seamless with molecular or fibre orientation along any preferred angle in three dimensional space to achieve the desired combination of strength and mechanical properties in the axial, radial and angular directions, such that under internal or external pressure, its ability to resist normal and shear stresses, fracture and deformation in any plane can be maximised.

Generally, when fracture occurs in an extruded section, it will occur due to the sheaf stress at its maximum value which develops as a result of the internal pressure. Previously, using known extrusion dies, it has not been possible to strengthen an extruded section in order to overcome the sheaf stress. By means of an extrusion apparatus having channels extending radially through a hollow member in the orientation control section, an extruded section may be produced in which the sheaf strength can be increased by controlling the molecular of fibre orientation in the radial direction.

Embodiments of the invention will now be described by way of example only with reference to the accompanying drawings in which:

FIGS. 12 and 13 are cross sectional views of the inner member of the device of FIG. 10 taken along A—A and B—B respectively;

FIG. 14 is a schematic diagram showing alternative channel cross-sectional shapes;

FIGS. 15, 16 and 17 are schematic diagrams of the inner member showing another channel configuration;

Figure 1A:
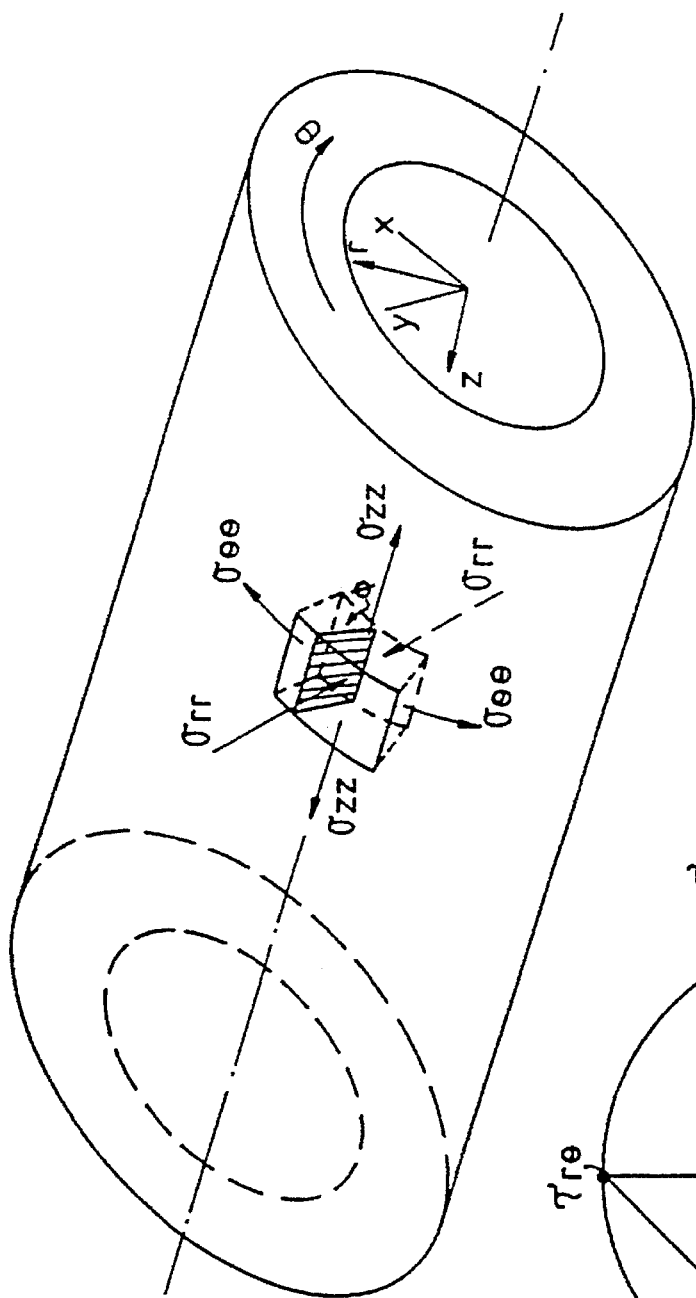
FIG. 1 is a schematic diagram showing the stresses which exist in a pipe section under internal pressure.
Figure 1B:
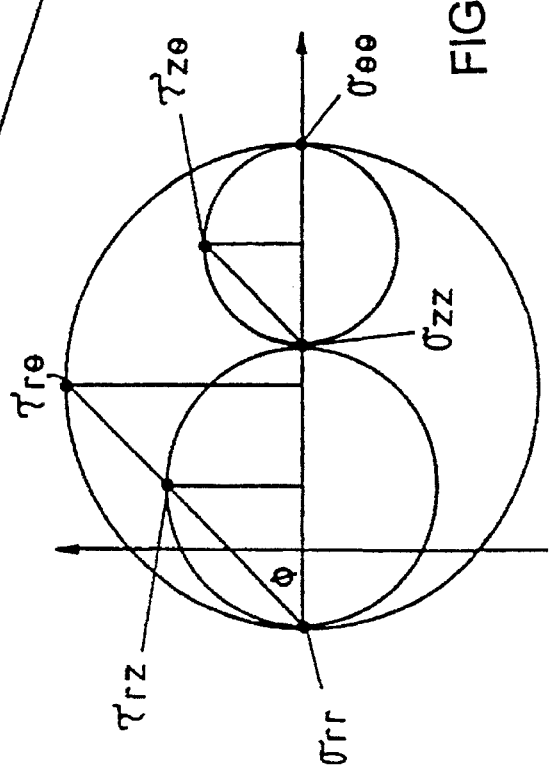

Referring to FIG. 1, an example of a pipe section under internal pressure is shown. The axis of the pipe is placed along the z axis in a cartesian co-ordinated system xyz with a point of origin O common with the r⊖z polar coordinate system.

Under internal pressure the stress along the r,z directions on a typical element of the pipe are shown.

The construction of Mohr's circle of stresses enables us to determine the direction and magnitude of the maximum shear stresses. (Alternative analytical methods yield identical results).

It is seen that the maximum shear stress occurs on a plane perpendicular to the xy plane at an angle to the x axis.

For the case when the radial stress (σr) is negligible (which is a common assumption for thin cylindrical shells) this angle is 45°, otherwise it is smaller by an amount dependent on the radial stress.

Figure 2:
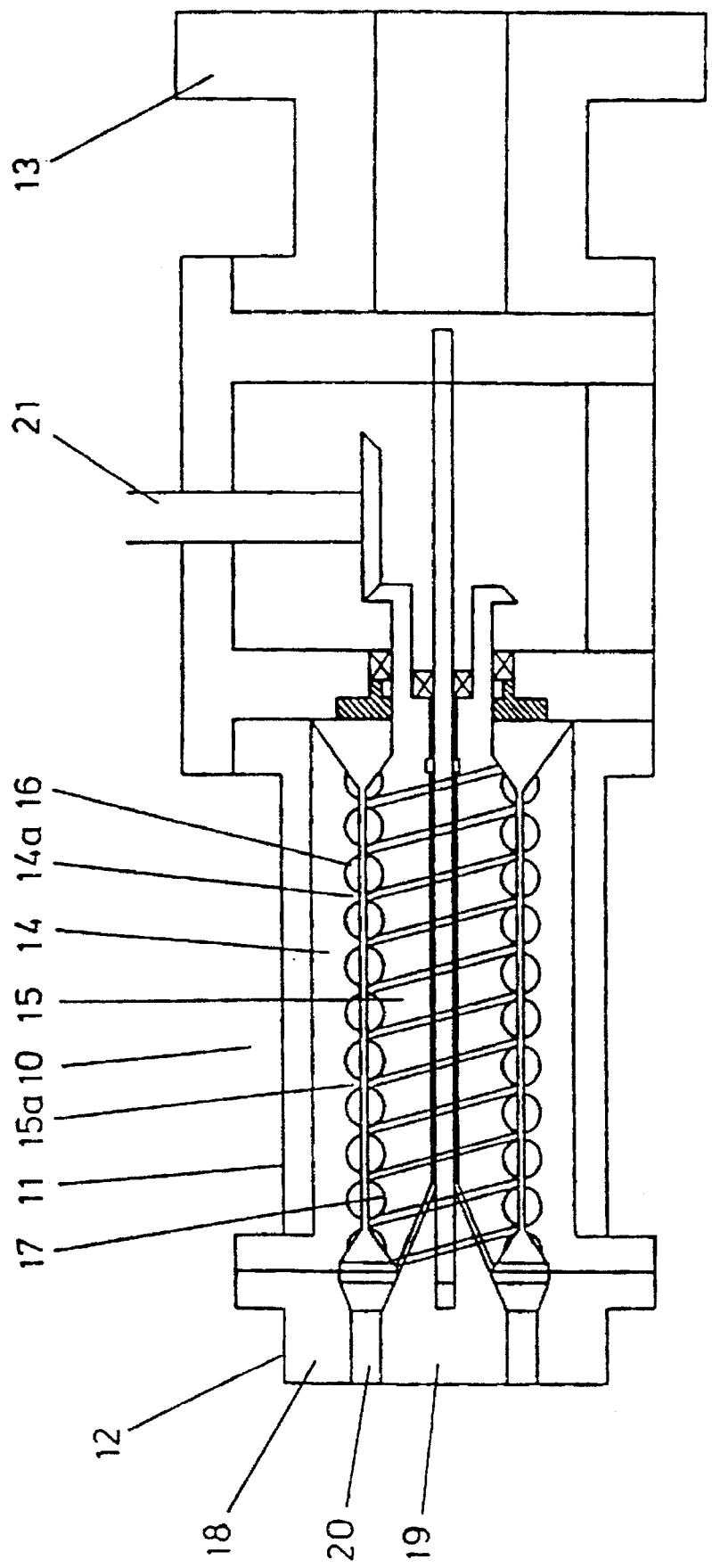
FIG. 2 is a schematic diagram of an extrusion apparatus according to the invention in which the inner member is rotatable, and the outer member is fixed.

Referring to FIG. 2 an extrusion apparatus according to the invention is in the form of an extrusion die and is designated generally by the reference numeral 10. The die 10 comprises an orientation control section 11, an exit portion 12, and entry portion 13. The orientation control section 11 comprises an outer member 14 and an inner member 15. The inner surface of the outer member 14 is formed into a channel 16 which extends radially outwardly into the outer member 14 and is separated axially by lands 14a. The channel 16 extends axially to define a helical channel from one end of the outer member 14 to the other. The inner member 15 is formed into a channel 17 which extends radially inwardly into the inner member 15. The channel 17 extends axially to define a helical channel from one end of the inner member 15 to the other and is separated axially by lands 15a. The channels 16, 17 are of substantially the same size and the pitch of each helix defined by the channels 16, 17 is substantially the same. The inner member 15 is positioned coaxially with the outer member 14 and the members 14, 15 are dimensioned such that the lands 14a, 15a are spaced apart from one another. Thus a space exists between the respective opposite surfaces of the members. The axial width of the lands 14a, 15a and the radial distance between them may be constant along the length of the orientation control section 11, or it may vary along the length of this section.

The exit portion 12 comprises an outer member 18, which is coaxial with members 14, 15 and defines a space. An inner member 19 is positioned coaxially with the outer member 18 and defines a space 20. The members 18, 19 are fixed.

In use, material to be extruded enters the orientation control section 11 via entry portion 13. Inner member 15 is rotatable by means of mechanism 21. The material may be any suitable material, for example a mixture of polypropylene reinforced with 15–20% by weight of glass fibres. This material is typically extruded within a temperature range of 180°–230°, at a pressure of between say 750 and 1500 psi.

As the material passes through the space formed between members 14, 15, some material will travel in an axial direction, and most will travel in a helical direction along a path defined by channels 16, 17. The rotation of the inner member 15 results in the material within channel 17 and the material relatively close to the outer surface of the inner member 15 acquiring an angular velocity. This velocity is transmitted radially towards the inner surface of the outer member 14 and within channel 16. The material thus acquires an increasing angular displacement and the fibres acquire an increasing degree of tangential orientation as the forming tube of extruding material flows over the length of the orientation control section 11.

When the extruding material reaches the exit part 12, it no longer rotates, since members 18, 19 do not rotate. This results in a transition section between extruding portion 11 and exit portion 12 where rotary motion is brought to a halt. At and near this cross-section, the material is subject to torsion which enhances the process of tangential fibre orientation. The material travelling along a helical path contains a tangential component of velocity thus also enhancing the process of tangential fibre orientation.

Thus, the final orientation of the material is due to the helical flow of the material due to the shape of channels 16, 17. It is enhanced by the rotation of one of the members, (here the inner member 15), and also further by rotationally induced torsion at the interface between exit member 18 and 19 of the exit portion 12, and members 14 and 15 of the orientation control section 11.

Figure 3:
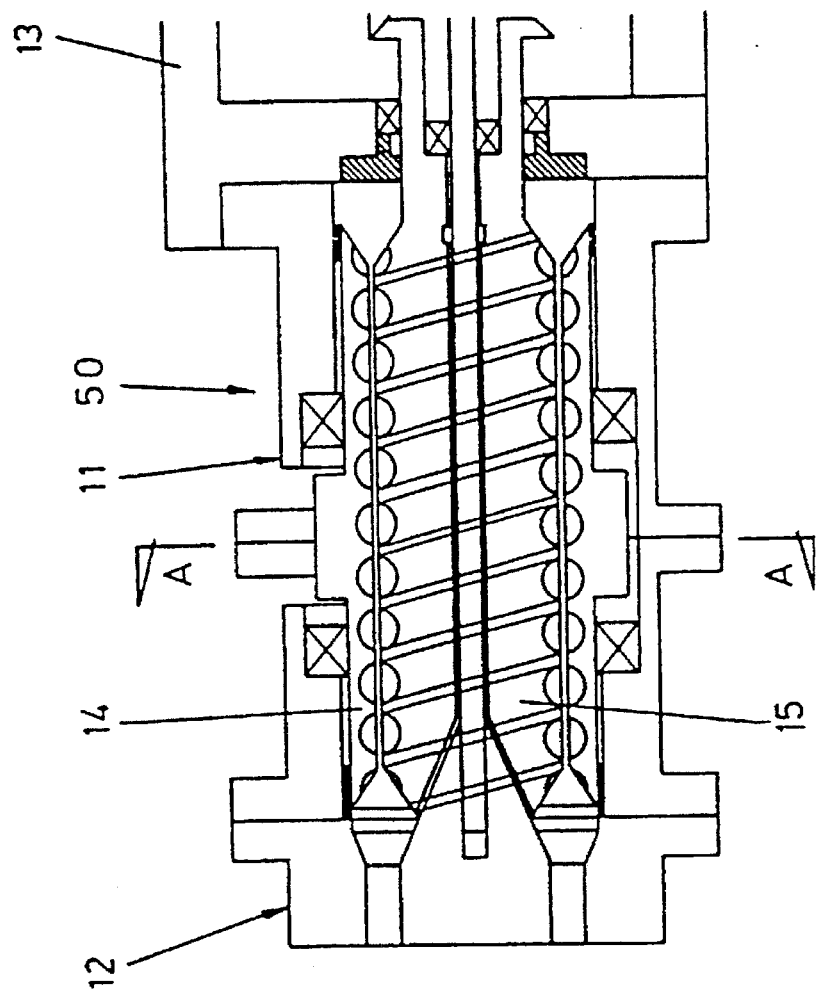
FIG. 3 is a schematic diagram of an extrusion apparatus according to the invention in which both the inner and outer members are fixed.
Figure 3A:
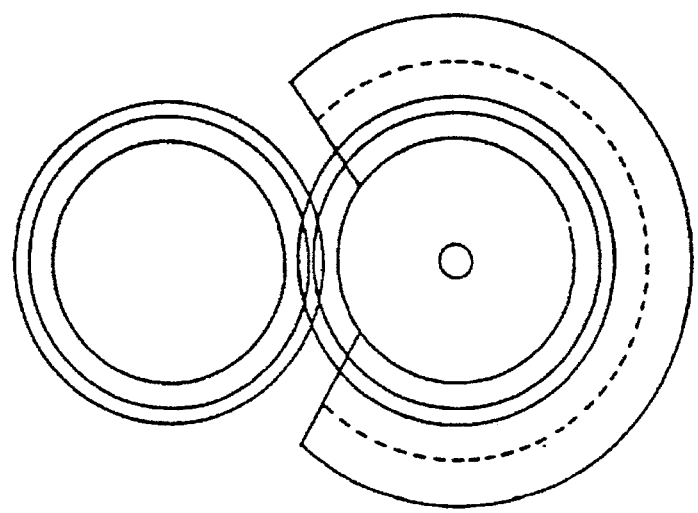
FIG. 3a is a schematic representation of the cross section along A—A of the apparatus of FIG. 3.

Referring to FIG. 3, a similar extrusion die is shown, and similar parts have been given equivalent reference numerals. The inner member 15 of the extrusion die 50 is stationary as is outer member 14. In this situation the orientation of the material is due to the helical flow only.

Figure 4:
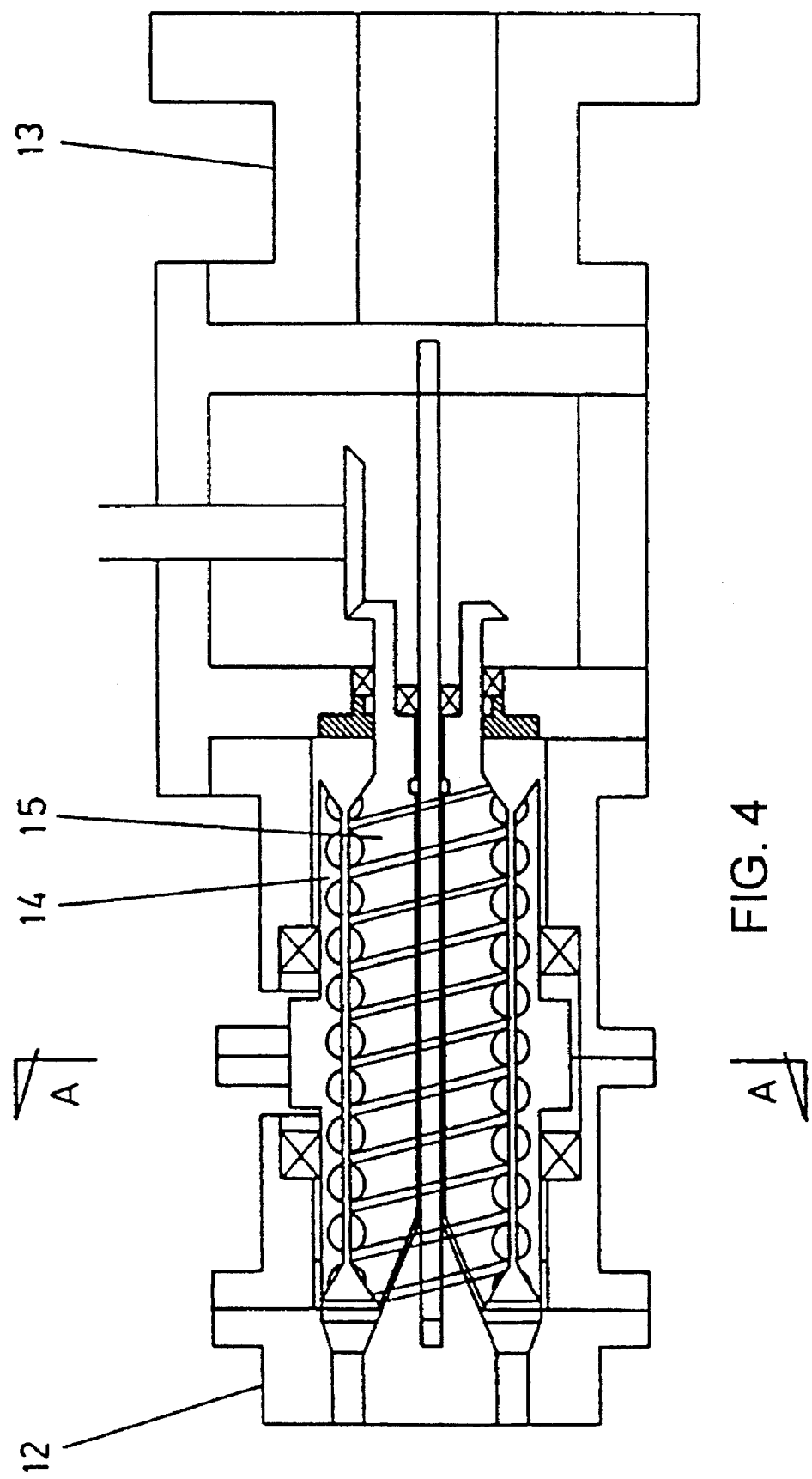
FIG. 4 is a schematic diagram of an extrusion apparatus in which both the inner and outer members are rotatable.

In the FIG. 4 example both members 14, 15 rotate during extrusion. This results in the orientation of the material due to the helical flow being enhanced by the rotation of both elements, and to the interfacial torsion.

Figure 5:
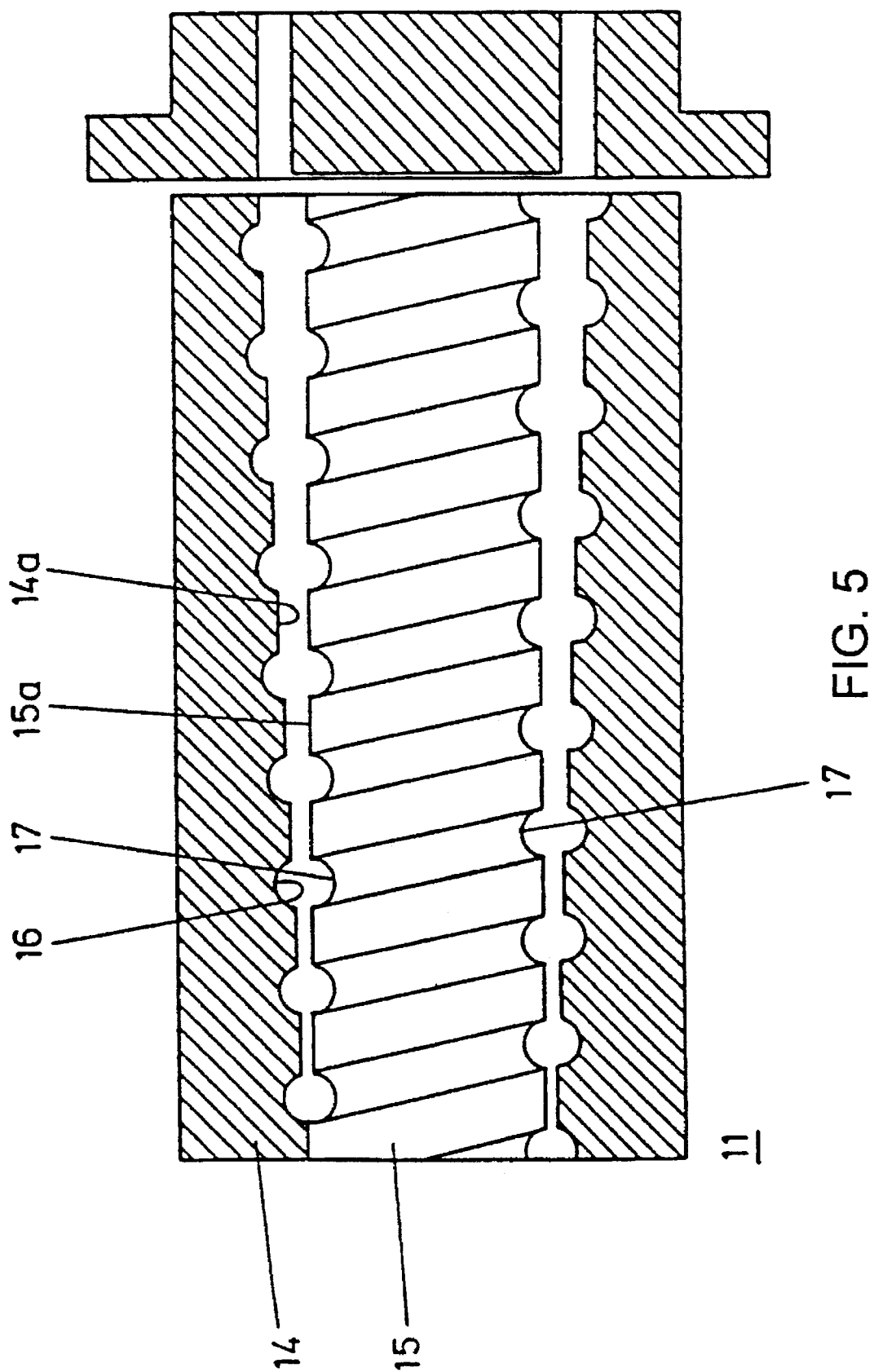
FIGS. 5, 6, 7 and 8 are schematic diagrams of extrusion apparatus according to the present invention showing how the dimensions of the members of the orientation section may vary.
Figure 7:
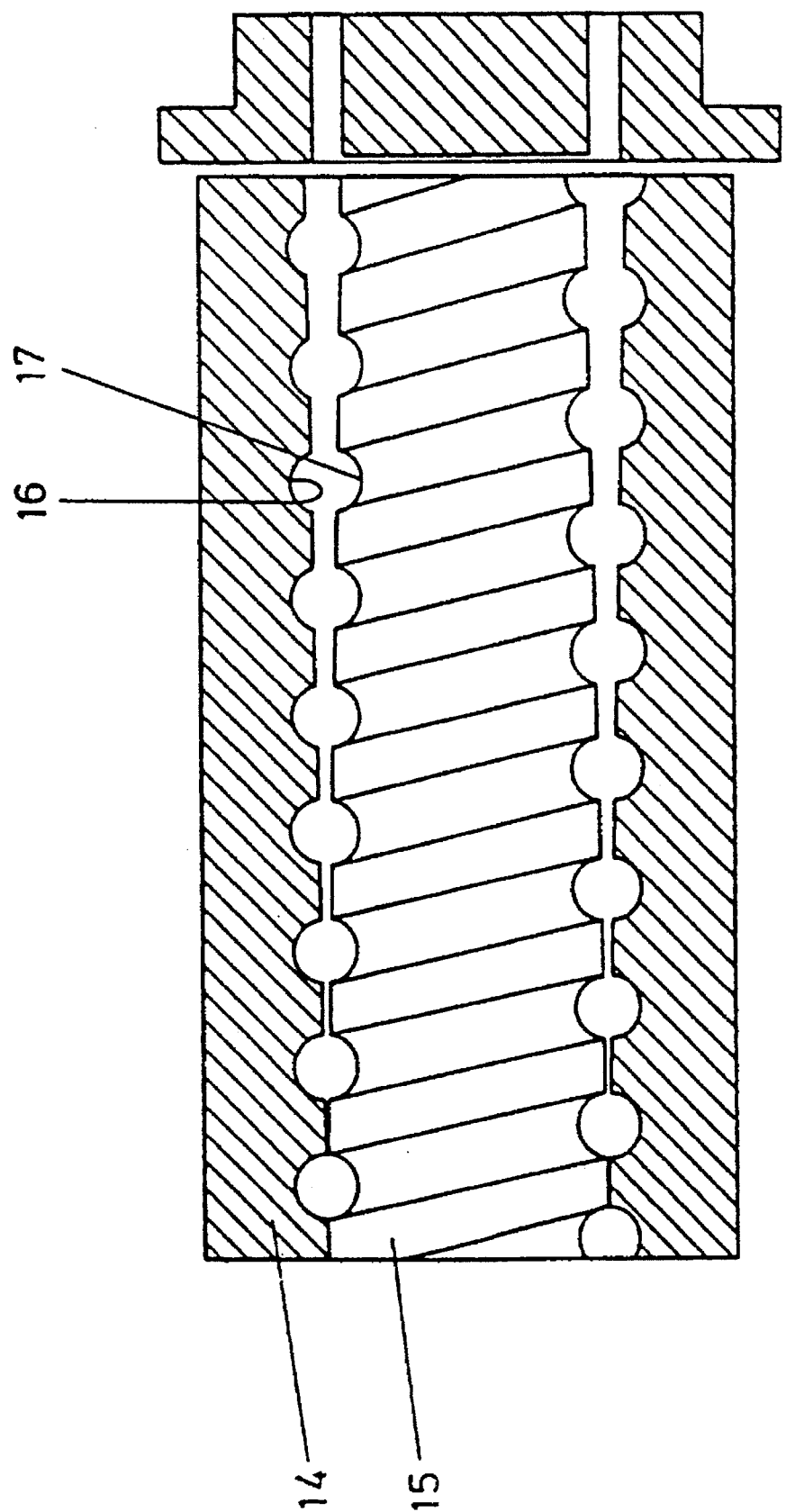

Referring to FIG. 5, the orientation section of an apparatus of any of the extrusion dies illustrated in FIGS. 1–3 is shown. The orientation control section comprises an outer member 14 and an inner member 15 similar to the orientation sections 11 illustrated in FIGS. 1 to 3. The outer and inner members 14, 15 may both be stationary, or may both be rotatable, or one may be rotatable and one may be stationary. In the orientation section 11 illustrated in FIG. 5, the outer member 14 is tapered to produce an increasing gap between the inner and outer members 14, 15. In addition the depth of the channel 16, 17 is constant along the length of the section 11. In the example in FIG. 7, the inner member 15 is tapered, to produce an increasing gap between the members 14, 15. Again, the depth of the channels 16, 17 is constant along the length of the section 11. As can be seen, in these two examples the gap between the inner and outer members 14 and 15, is zero at one end and increases to the value of the final thickness of the emerging pipe at the other end.

Figure 6:
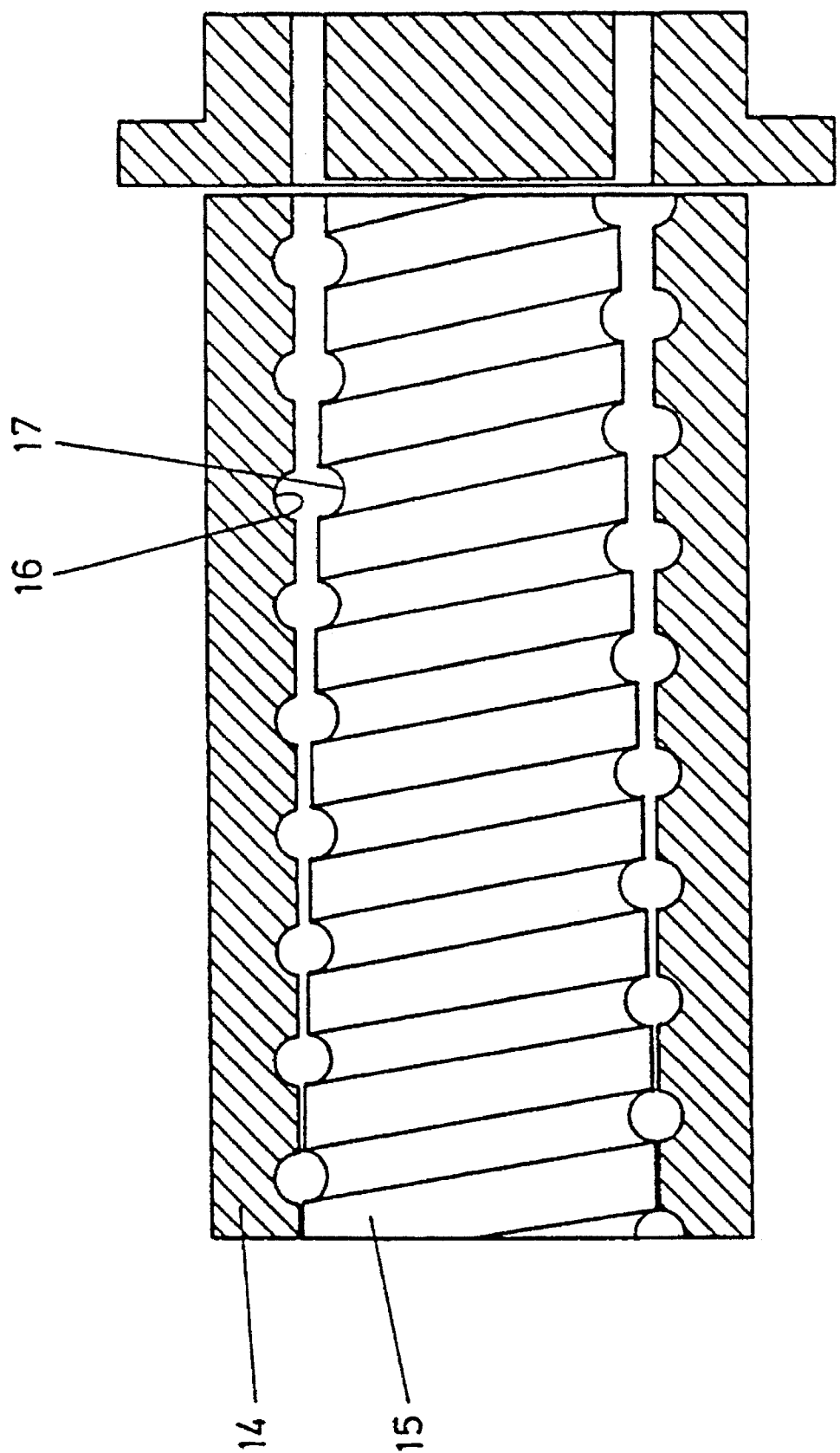

In the example illustrated in FIG. 6, the gap between the members 14, 15 increases along the length of the section 11, and in addition, the channel depth of the channels 16, 17 reduces along the length of the section 11.

Figure 8:
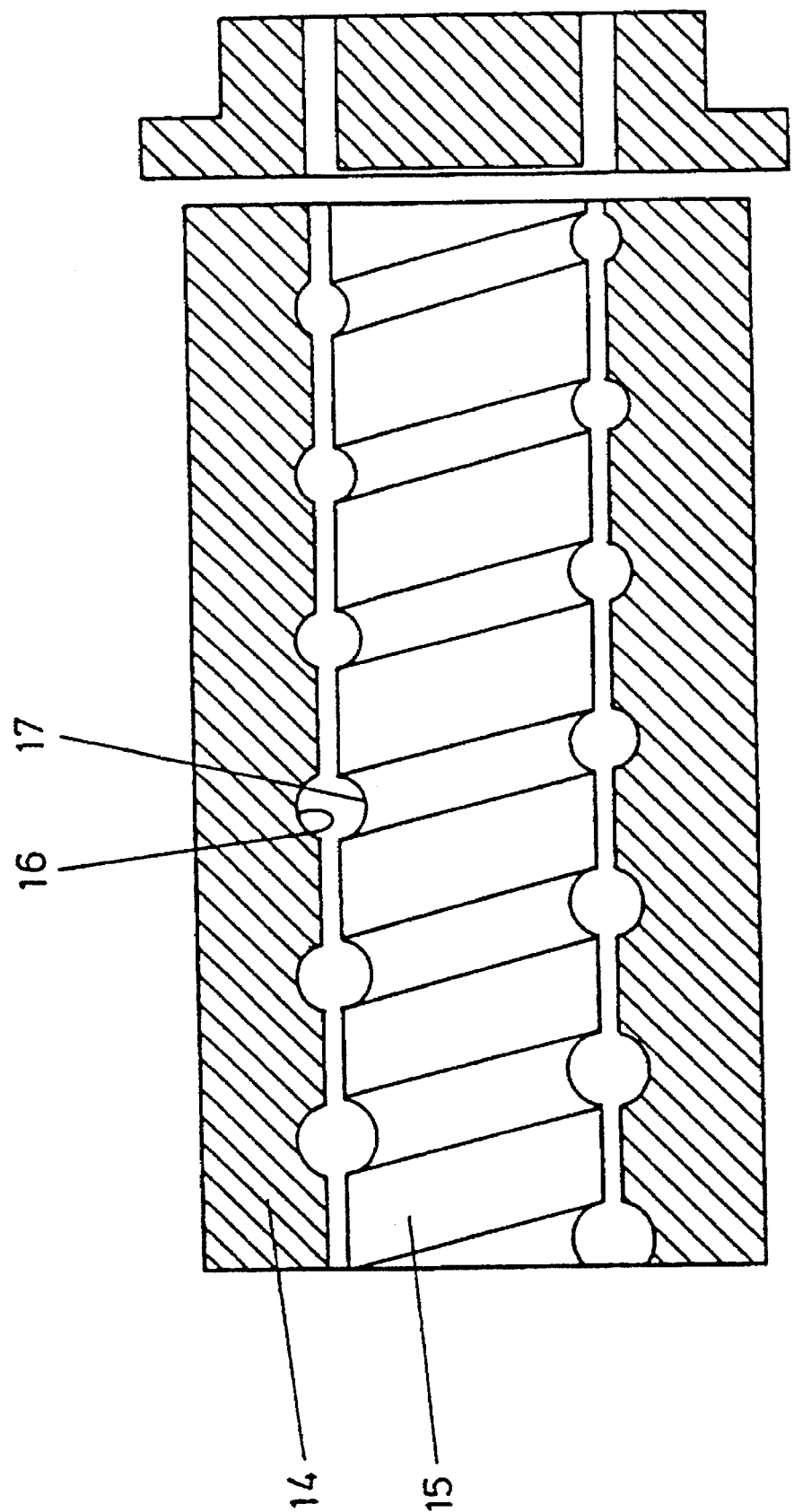

In the example shown in FIG. 8, there is a constant gap between the members 14, 15, but the depth of the channel 16, 17 varies along the length of the section 11.

Figure 9:
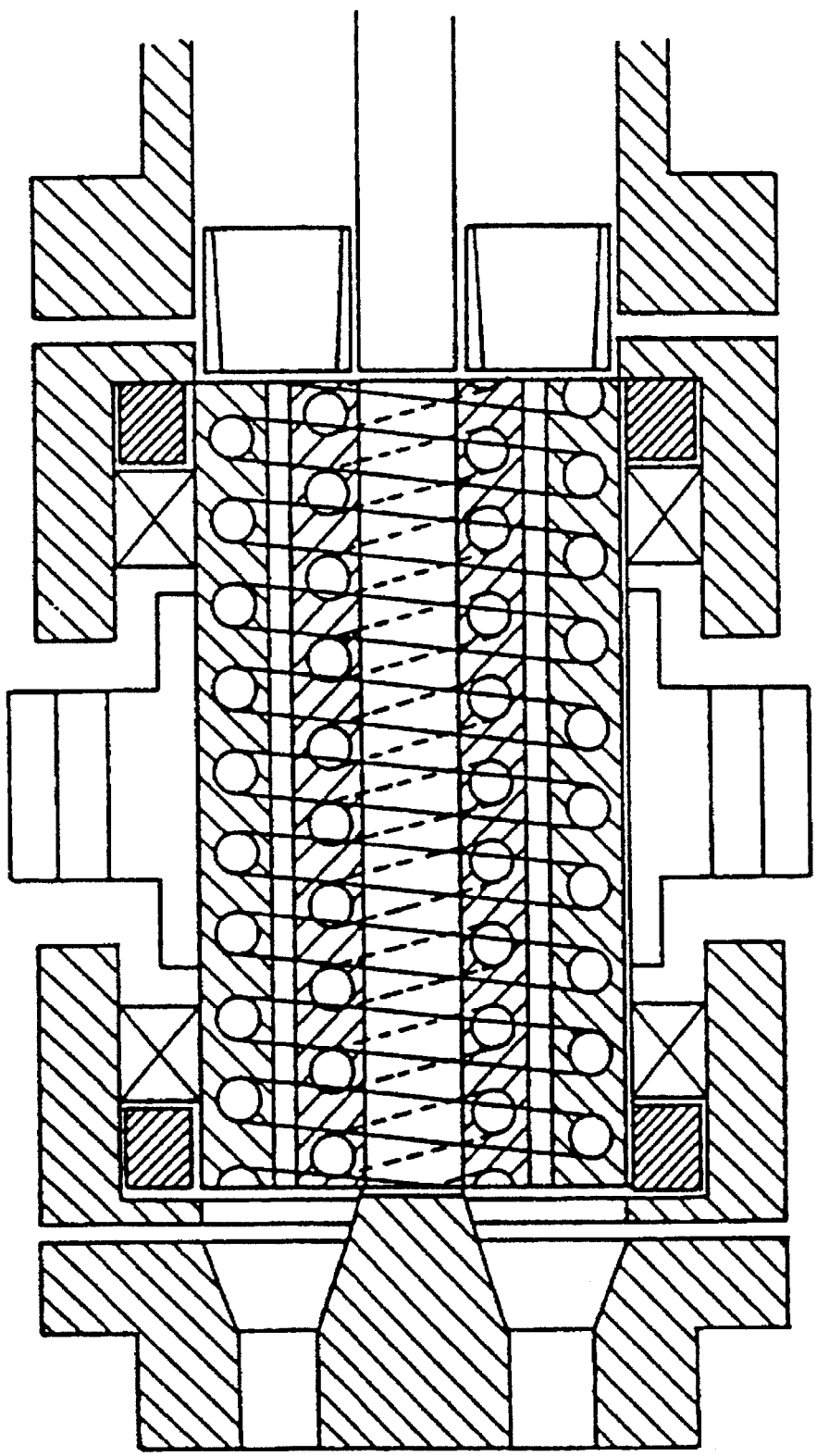
FIG. 9 illustrates an extrusion apparatus according to the present invention having counter rotating closed spiral channels on the inner and outer members of the orientation section.

Referring to FIG. 9, an orientation section 11 is shown having completely enclosed inner and outer channels 16, 17.

In addition, the channels 16, 17 are counter rotating in opposite directions and are of opposite senses and there is a constant axial gap between the inner and outer members 14, 15. This produces a pipe with an outer part of its thickness oriented tangentially in one sense and an inner part oriented tangentially in an opposite sense.

Figure 10:
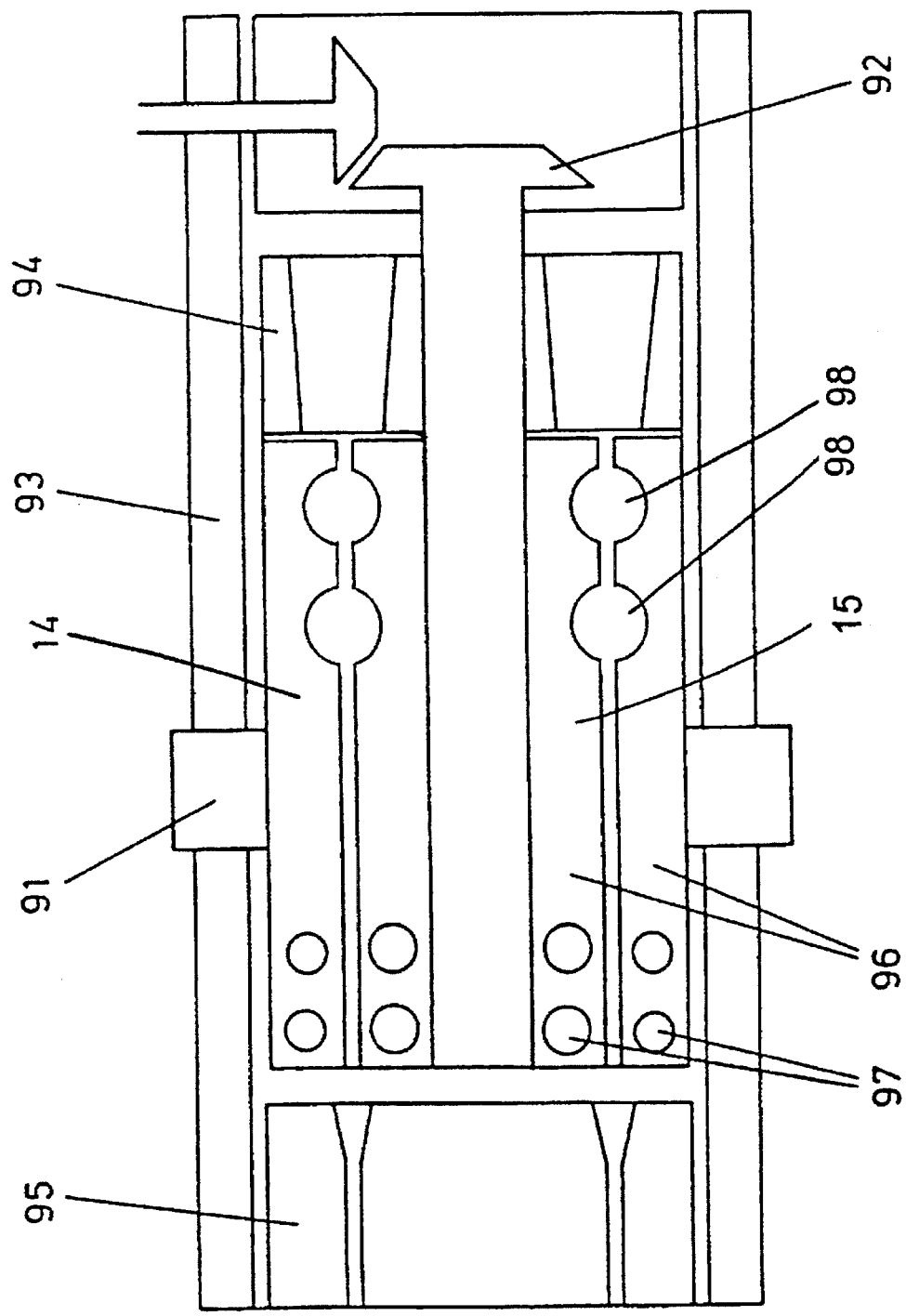
FIG. 10 is a schematic diagram of an extrusion apparatus according to the present invention showing the general layout of the apparatus.

Referring to FIG. 10, the general layout of an extrusion die according to the present invention is shown in which both the inner and outer members 14, 15 are rotatable. The apparatus comprises drive 91 for rotating the outer member 14, and a drive 92 for rotating the inner member 15. The apparatus is contained in a housing 93 and comprises an entrance control section 94, and an exit control section 95. The orientation control section 96 comprises the inner member 14 and outer member 15 and a gap between the two members. Channels 97 are examples of totally enclosed inner and outer channels, and channels 98 are examples of semi closed (or connected) inner and outer channels.

In general, it is possible to establish techniques of co-extrusion and cross-head dies, to supply the helical channels with different material, or different grades of material, or different mixtures of fibres and plastics.

The embodiments of the invention illustrated in FIGS. 2 to 10 may be used to control the orientation of fibres or molecules in the axial and angular directions only.

Figure 11:
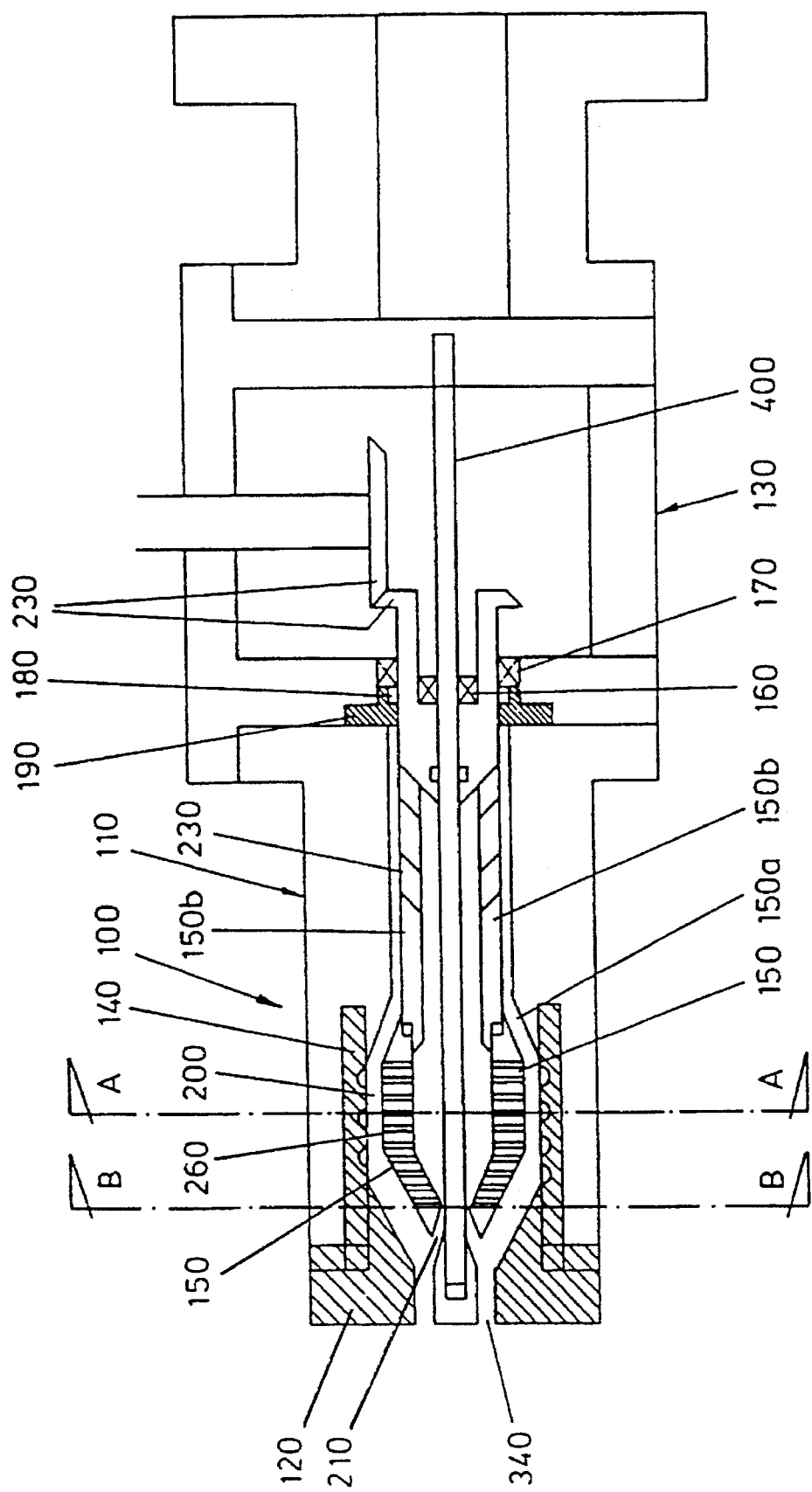
FIG. 11 is a schematic diagram of a further extrusion device according to the invention.
Figure 18:
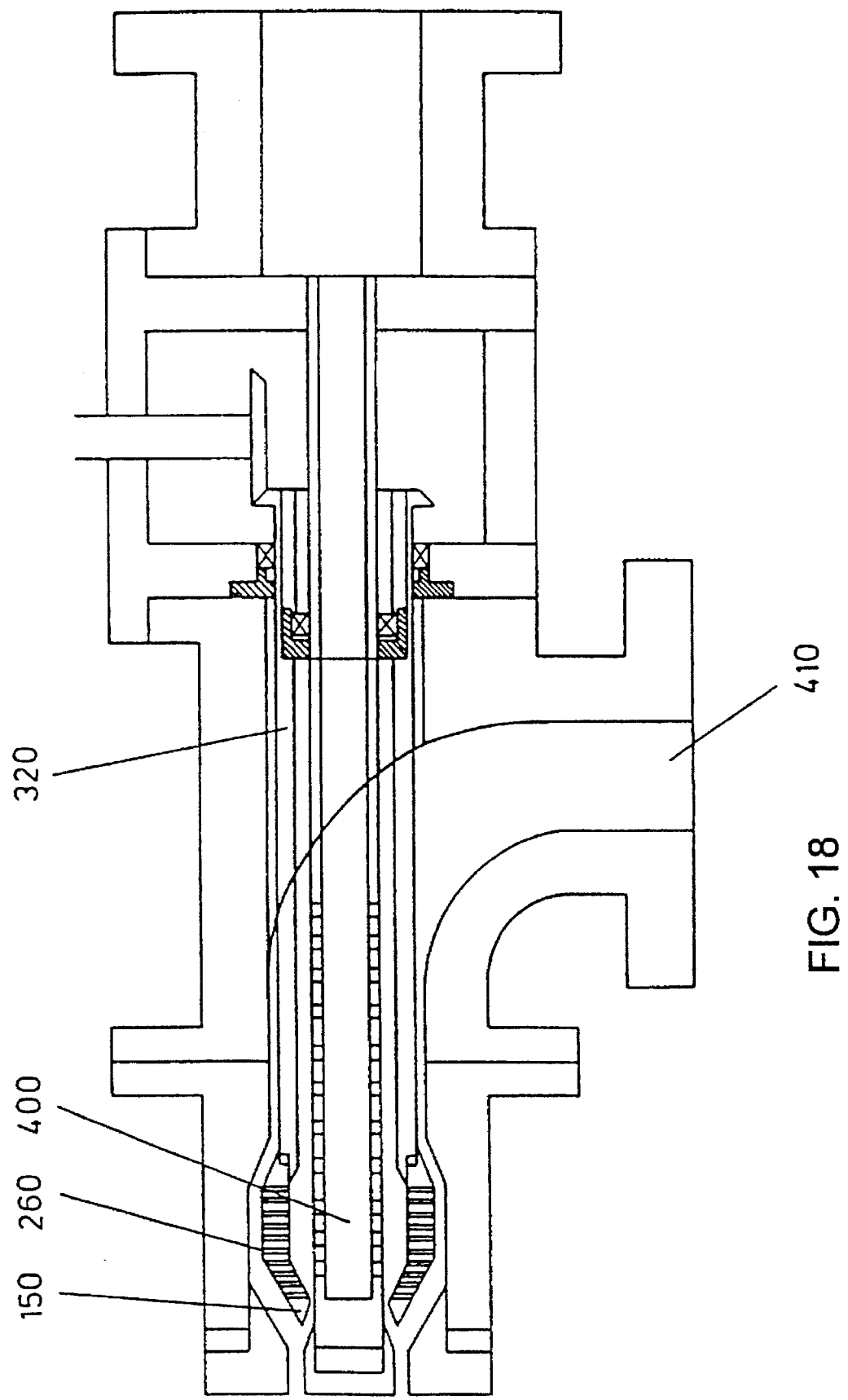
FIG. 18 shows an extrusion device similar to that of FIG. 10 extruding the invention in which two different extruding materials may be used.
Figure 19:
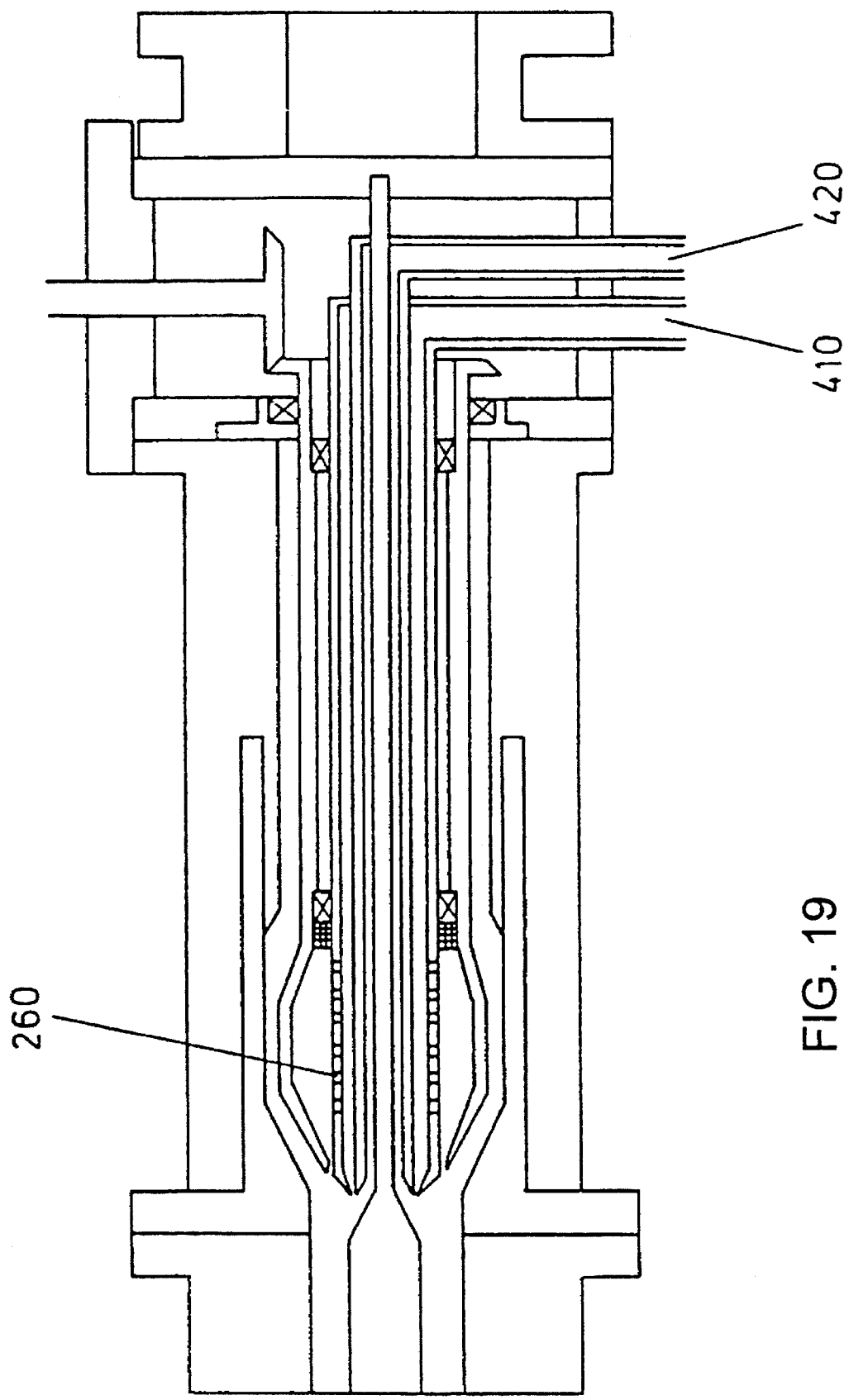
FIG. 19 shows an extrusion device similar to that of FIG. 10 in which three extrusion materials may be used.

Referring to FIG. 11 an extrusion apparatus according to the invention is in the form of an extrusion die and is designated generally by reference numeral 100. The extrusion apparatus may be used to control the fibre or molecular orientation in the radial direction as well as the axial and angular directions. The die 100 comprises an orientation control section 110, an exit portion 120 and an entry portion 130. The orientation control section 110 comprises an outer member 140 and an inner member 150. The inner member 150 is formed from two portions 150a and 150b. Portion 150a is cylindrical in shape, and has conical tips on either end of the cylindrical portion. Portion 150b is substantially cylindrical, and both parts 150a and 150b are hollow. Member 150 is rotatable, and is supported by sealed bearings 160, 170 and further protected by seals 180 and 190. Parts 150a and 150b which form the member 150, can move relative to each other at the junction between the two portions. This allows the gap in the conical portion between the inner and outer members to be adjusted. The member 150 is powered by means of gears 230 or any other means suitable for causing the member 150 to rotate. The inner member 150 comprises channels 260 which extend from an outer surface to an inner surface of the inner member 150. The channels 260 are mainly formed in portion 150a of the inner member 150. The channels 260 are formed by machining through the thickness of the member 150 or by making the member out of stacked discs with the channels engraved on the interfacial faces between the discs which are then fixed together to form portion 150a. Their function results from the fact that they can be made small enough to produce tiny streams flowing like strands of highly sheared and highly oriented spun fibres. These conditions can be similar to those used in synthetic fibre spinning from melts. In use, when material is passed through the extrusion die 100, a multitude of tiny extruded strands will be formed which can be collected together within section 120 of the die 100 and combined with other portions of the flow of material to give a strong product. Since the orientation of the material is produced within the channels 260, the orientation of the molecules or fibres or both within the final product will have the same magnitude but its direction will depend on how the strands are placed together within the thickness of the product. This is achieved by letting the strands of material leave the inner member 150 in a tangential direction, whilst it rotates.

Referring to FIGS. 12 and 13, the cross sectional arrangement of the channels 260 is shown. The channels 260 are curved along their length to increase the path of the melt although other shapes of channels are also possible. FIG. 14 shows an alternative shape of channel, where as can be seen the channels are straight along their length. Such an arrangement is easier to manufacture than the curved shape shown in FIGS. 12 and 13, but results in a slightly shorter channel length. Straight channels are almost as effective in producing a strong product from extruding a material, as the curved channels 260, as the final direction of the oriented strand of the material is determined by positively replacing it in a plane perpendicular to the axis, and at an angle to the radius and axis, which is controlled by the rotational speed of the member 150 and the direction of the exit.

The intended direction of rotation of the member 150 will determine the direction of the spiral of the channels or vice versa. In use, the whole assembly 100 is heated on the outermost surface in the usual manner practised in the extrusion industry. The material to be extruded is supplied as a melt which is supplied from an extruder or any other means of preparing a melt. The material may comprise a mixture of fibres and polymer melt for example or any other fluid to be extruded. The melt emerges at high pressure through the entry portion 130 and it then flows through passage 310 in entry portion 130 into gap 200 in the orientation control section 110 between members 140, 150. Some of the material will flow into the holes 230 and some will flow axially through the gap. The portion of the material which flows through the holes 230 will be forced by the extrusion pressure through the channels 260, and a smaller portion of the material will be forced through gap 210. All three portions of material flowing through gap 200, 210 and the channels 260 will unite again in section 120 of the extrusion die 100. The material then flows through annular gap 340 which forms the shape of the extruded product. The adjustment of the gap 200 as described earlier, enables control of the proportions of the extruded material flowing through the various parts of the die 100 as explained above.

The portion of the material flowing through gap 200, and also that flowing within member 150, will be subjected to shear in the direction of the angular rotation of the rotating member 150. This will cause molecular and also fibre, (if present), orientation in the hoop (tangential) direction of the extruded tube or pipe.

Material flowing through the channels 260 will emerge like strands into gap 200 and will be subjected to substantial shear flow within the channels and thus a considerable amount of orientation. When leaving the channel 260, each strand will have the direction of the spiral at the edge of the member 150 having a relative velocity to it which is proportioned to the pressure inside member 150 plus the velocity due to rotation. This will place the strands within the annular gap 340 partially tangentially to the member 150 and partially radially oriented at an angle in the xy plane which can be calculated using standard methods. The material then acquires an axial component primarily in the stationary section 120 due to meeting the flow from gap 210. When the channels are formed in planes which are perpendicular to the axis of the die 100, the molecules have a general direction substantially tangential and radial and hence contribute tremendously to the strength of the pipe as their orientation has been placed by this combination of velocity components in the desired direction. In the case when the channels are in planes parallel to the axis of the die 100 they are still at an angle to the axis as shown in FIG. 16. This is due to the relative velocity of rotation of the channels in the plane which is perpendicular to the axis of the die 100.

In all cases there will be an orientation component in the radial, tangential and axial directions. The radial component will improve the shear strength, and the tangential component will improve the hoop strength and the axial component will improve the axial strength. The adjustment of the three flows and the operating parameters (i.e. rotation of speed, the extrusion pressure, the relative sizes of the gaps and the relative lengths of the member 150 and its sub portions 150a, 150b, the length of the other parts of the die 100 etc will allow the control over the relative magnitude of all three components.

FIGS. 16, 17 show how the orientation of the channels 260 may vary in different parts of the member 150.

Referring to FIG. 14, various alternative cross sections of channels are shown. As can be seen the cross sectional shape may be circular, rectangular, or any other suitable shape.

Figure 20B:
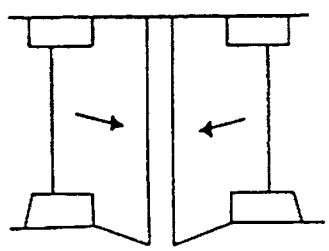
FIGS. 20a and 20b are details of FIG. 20.
Figure 20A:
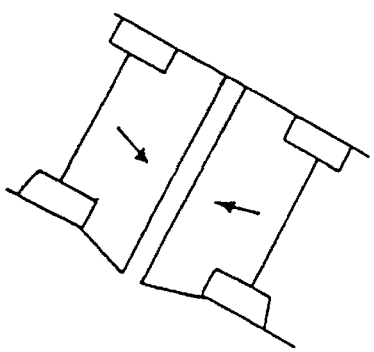
Figure 20:
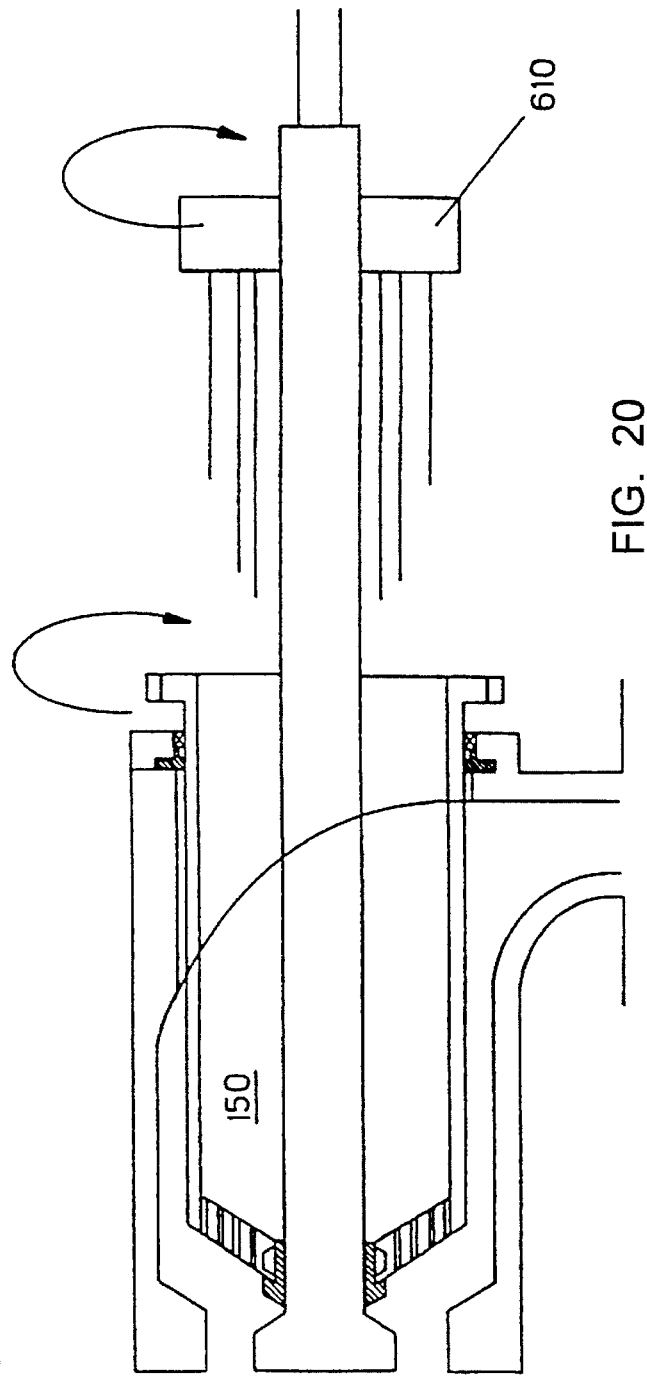
FIG. 20 shows an extrusion device similar to that of FIG. 10 in which the inner member is open to the rear.
Figure 21:
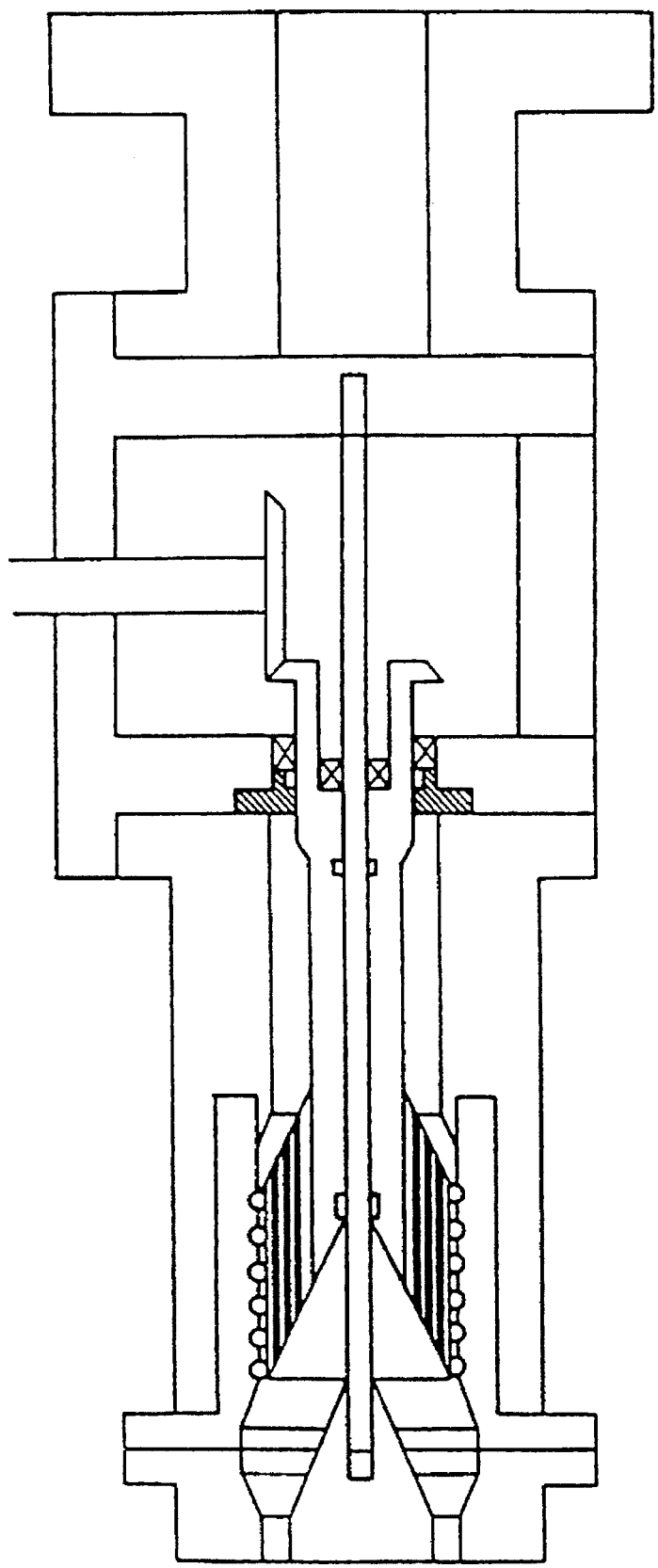
FIGS. 21, 22, 23, 24, 25 and 26 illustrate further alternative configurations of the orientation control section.
Figure 22:
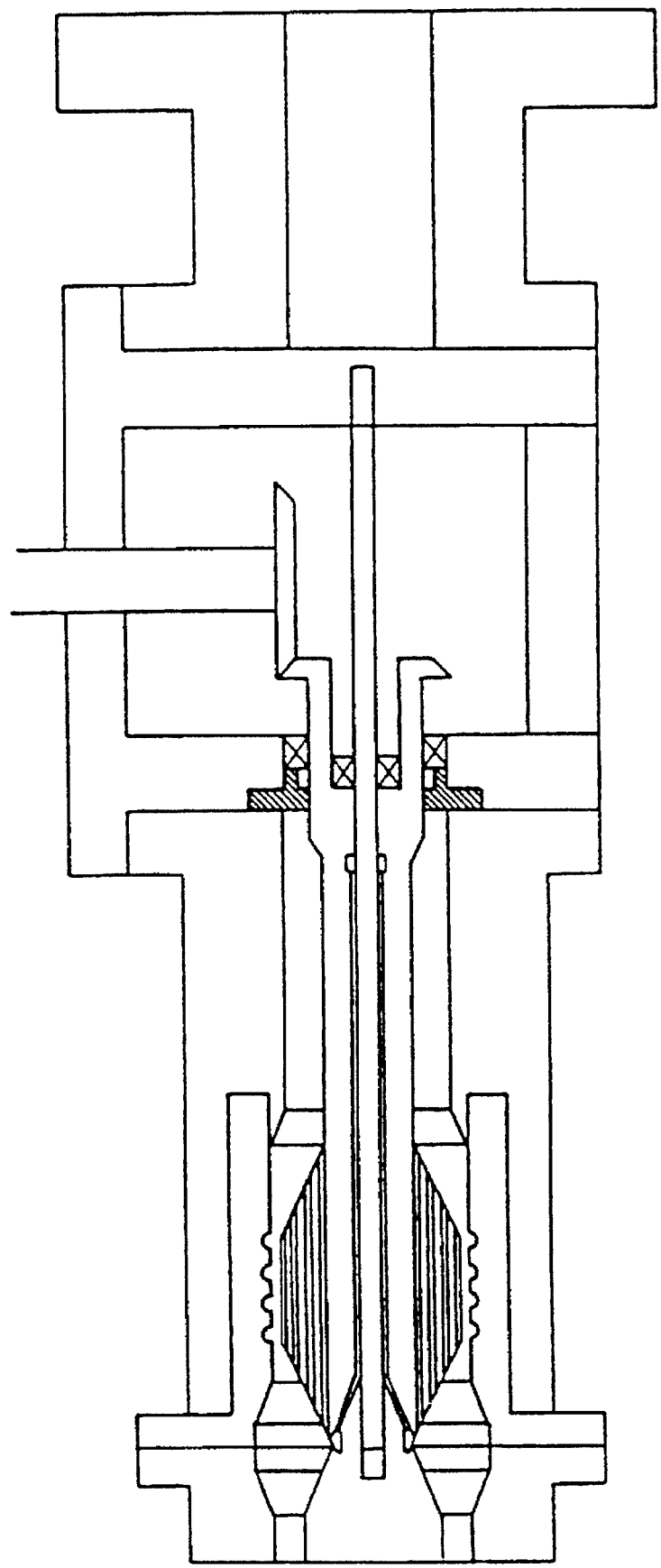
Figure 23B:
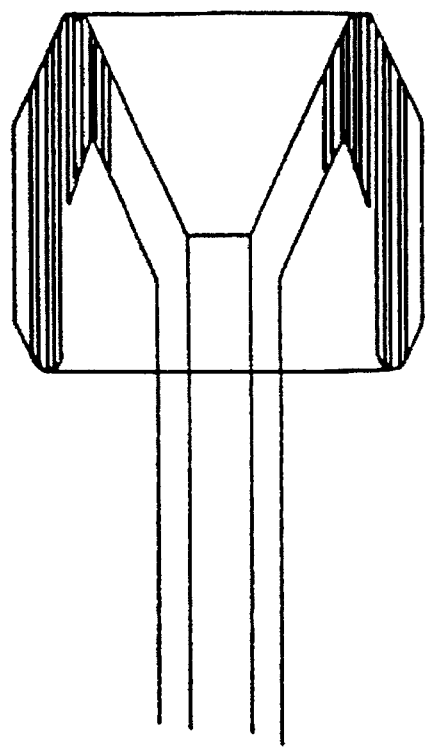
Figure 23A:
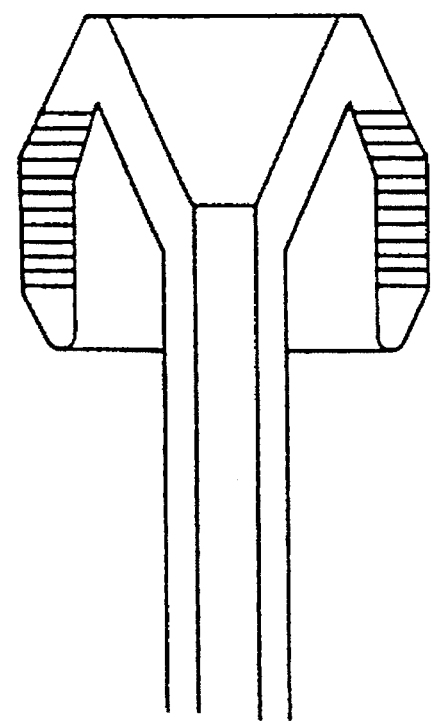
Figure 24B:
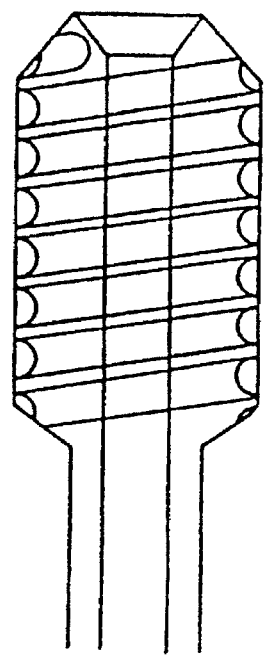
Figure 24D:
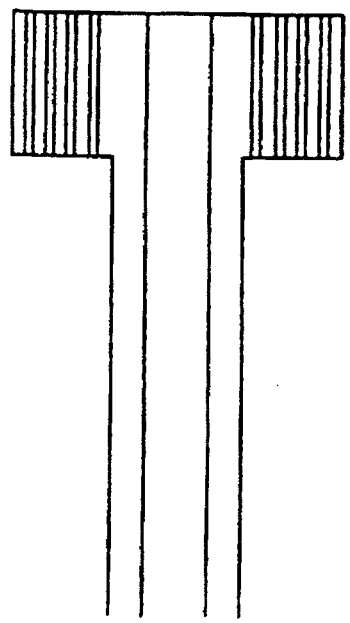
Figure 24A:
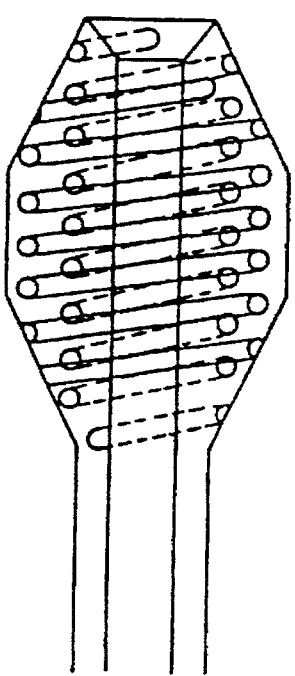
Figure 24C:
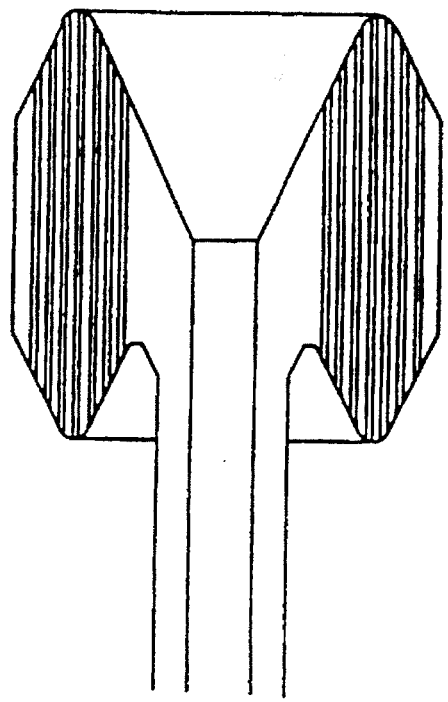
Figure 25B:
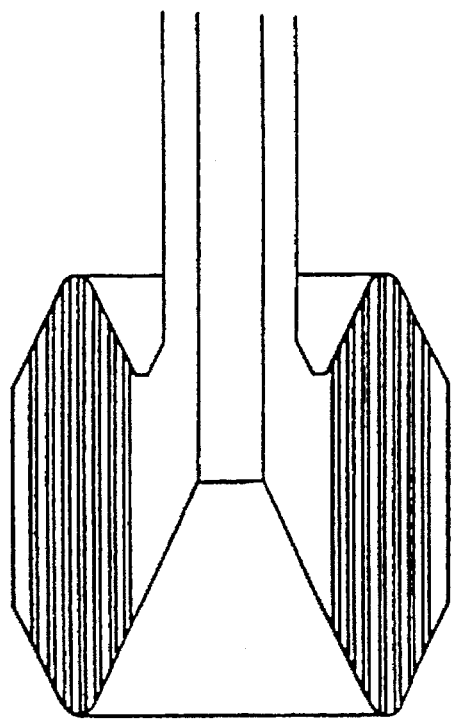
Figure 25D:
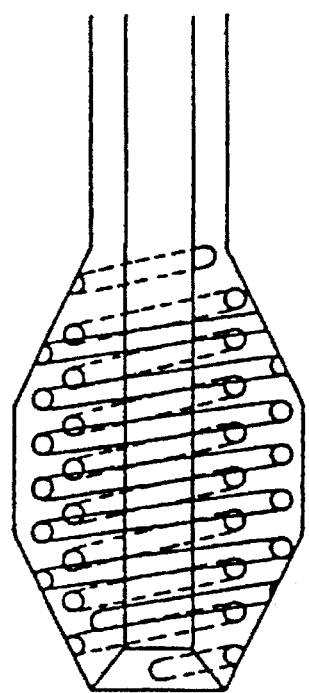
Figure 25A:
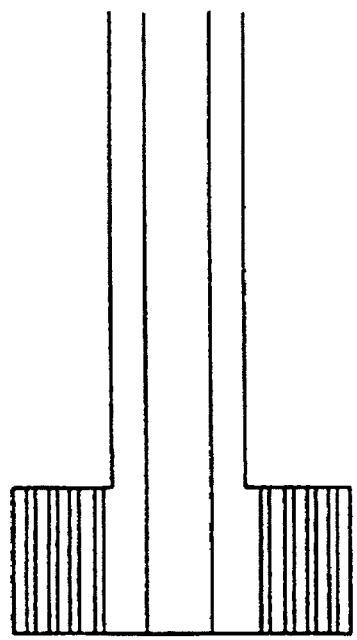
Figure 25C:
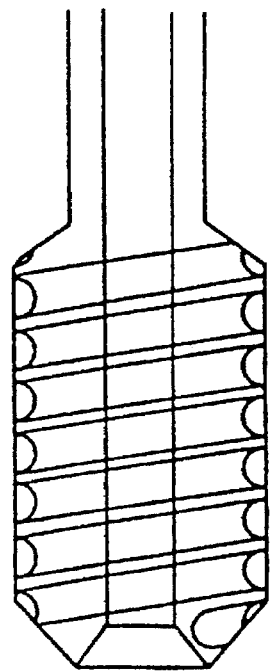
Figure 26B:
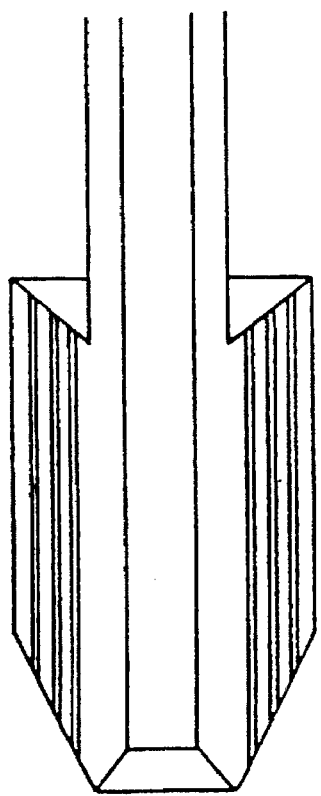
Figure 26D:
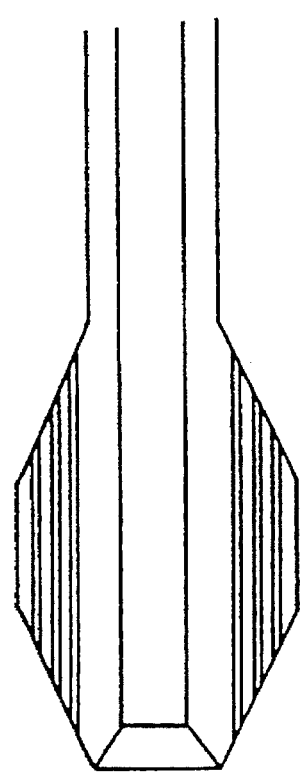
Figure 26A:
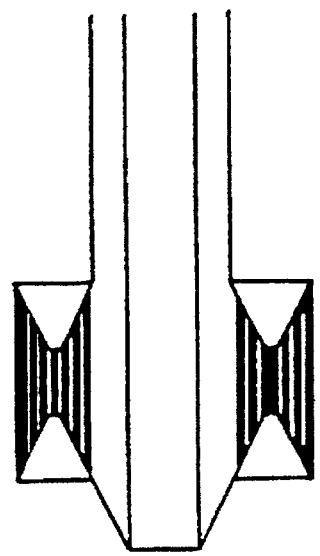
Figure 26C:
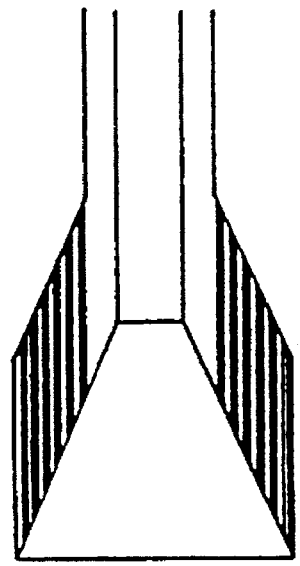

Referring to FIG. 20 a extrusion device according to the invention is shown in which the inner member 150 is open to the rear to allow the continuous feeding of continuous fibres. These are supplied from a carrier 610 which is rotating at the same speed as the member 150. The fibres are guided through the rotating member through rubber seals shown in FIG. 20a and 20b. The pressure in the adjustable gap will press the rubber of the seal in the direction of the arrows to seal around the fibres. This type of inner member 150 can be combined with the previously described embodiments of the invention to give a continuously reinforced extruded section. The drag of the axial flow and the rotational motion of the fibres will produce a helical structure at several depths through the thickness of the pipe. The extruded pipe itself could be rotated instead of the member 150. This would mean that the front section and the rotor would be designed to swap roles to avoid the complexity of rotating the entire fibre supply.

The apparatus illustrated in FIGS. 11 to 20 allows the orientation of molecules or fibres in an extruded section to be controlled in the axial, radial and angular directions. The resultant hollow section may thus withstand stresses caused from the internal or external or combined pressures to which the section is subject during the extrusion process.

The resultant hollow section will thus be continuous and seamless with molecular or fibre orientation along any preferred angle in three dimensional space.

FIGS. 21 to 26 illustrate further alternative configurations of the orientation control section.

I claim:

1. An extrusion die apparatus for extruding plastic material along an extrusion axis, the apparatus having a radial direction perpendicular to the extrusion axis, wherein the plastic material contains at least one of fibers and molecules for reinforcing the plastic material, the apparatus comprising:

an orientation control section having a nozzle and a mandrel that extend co-axially with the extrusion axis, the mandrel being positioned within an internal space formed in the nozzle, and spaced apart from the nozzle, the orientation control section having an entrance end and an exit end, such that the plastic material is allowed to flow into the orientation control section from the entrance end and to exit the orientation control section through the exit end, the plastic material flowing through the orientation control section in an extrusion direction, wherein a first portion of the plastic material is allowed to flow through the extrusion die apparatus in a substantially axial direction by flowing within the internal space formed in the nozzle thus imparting an axial component to the fibers;

an open helical channel formed in the nozzle such that a second portion of the plastic material is allowed to flow in a substantially tangential direction to the mandrel thus imparting a tangential component to the fibers, the open helical channel having an entrance opening located at the entrance end of the orientation control section and an exit opening located at the exit end of the orientation control section, such that the second portion of the plastic material is allowed to flow into the helical channel through the entrance opening and is allowed to exit the helical channel through the exit opening; and substantially radial channels formed within the mandrel that allow a third portion of the plastic material to flow through the mandrel in a substantially radial direction thus imparting a radial component to the fibers.

2. An apparatus according to claim 1 wherein the mandrel that contains the radial channels is rotatable about the extrusion axis.

3. An extrusion die apparatus for extruding plastic material along an extrusion axis, the apparatus having a radial direction perpendicular to the extrusion axis, wherein the plastic material contains at least one of fibers and molecules for reinforcing the plastic material, the apparatus comprising:

an orientation control section having a nozzle and a mandrel that extend co-axially with the extrusion axis, the mandrel being positioned within an internal space formed in the nozzle, and spaced apart from the nozzle, the orientation control section having an entrance end and an exit end, such that the plastic material is allowed to flow into the orientation control section from the entrance end and to exit the orientation control section through the exit end, the plastic material flowing through the orientation control section in an extrusion direction, wherein a first portion of the plastic material is allowed to flow through the extrusion die apparatus in a substantially axial direction by flowing within the internal space formed in the nozzle thus imparting an axial component to the at least one of fibers and molecules; and substantially radial channels within the mandrel that allow a second portion of the plastic material to flow through the mandrel in a substantially radial direction wherein the radial channels are curved to impart a radial and tangential component to the at least one of fibers and molecules.

4. An apparatus according to claim 1 further comprising an exit portion downstream of the orientation control section, the exit portion having:

a fixed outer exit member substantially co-axial with the extrusion axis; and a fixed inner exit member substantially co-axial with the extrusion axis, the outer and inner exit members forming a substantially annular space.

5. A apparatus according to claim 1 wherein a gap region having a shape is defined between an internal first surface of the nozzle and an external second surface of the mandrel and wherein the mandrel includes a shaft adjacent to a head, the head of the mandrel being located downstream of the shaft along the extrusion direction and such that the shaft and the head can move relative to one another in a direction along the extrusion axis thus varying the shape of the gap region between the mandrel and the nozzle in an area of the orientation control section whereby the orientation of the fibers is thus adjusted.

6. An apparatus according to claim 3 wherein the radial channels extend from an inner surface of the mandrel to an outer surface of the mandrel, the radial channels lying substantially in a radial plane relative to the axis of the extrusion die apparatus.

7. An apparatus according to claim 6, further comprising a multiplicity of additional substantially radial channels, the additional radial channels being grouped into sets of channels, each set of channels lying substantially in one of a plurality of parallel radial planes the parallel radial planes being spaced apart along the length of the mandrel, each radial plane containing one or more radial channels.

8. An extrusion die apparatus for extruding plastic material having at least one of reinforcing fibers and reinforcing molecules for reinforcing the plastic material, the plastic material being extruded along an extrusion direction, the extrusion die apparatus comprising:

an orientation control section having an outer stationary member and an inner member, the outer stationary member having an axis extending in the direction of extrusion, and having an internal first surface defining an internal space, the orientation control section having an entrance end and an exit end, such that the plastic material is allowed to flow into the orientation control section from the entrance end and to exit the orientation control section through the exit end, the plastic material flowing through the orientation control section in the extrusion direction;

wherein the inner member is positioned within the internal space and is arranged to extend substantially co-axial with the outer stationary member and is rotatable about the axis, the inner member having an external second surface which is spaced apart from the internal first surface of the outer stationary member, wherein the inner and outer members are dimensioned such that the internal first and external second surfaces are radially spaced apart from one another; and wherein the inner member includes a plurality of substantially radial channels that allow a portion of the plastic material to flow through the inner member and into the internal space between the external second surface of the inner member and the internal first surface of the outer stationary member, the radial channels lying substantially in a radial plane relative to the axis of the extrusion die apparatus and each radial channel having a cross-sectional area that varies along the length of the radial channel in an increasing fashion from within the inner member to the external second surface of the inner member.

9. An extrusion die apparatus as recited in claim 8 further comprising an exit portion positioned downstream of the orientation control section, the exit portion having a fixed outer exit member substantially co-axial with the outer and inner members, the outer exit member defining a substantially cylindrical space, the exit portion also having a substantially cylindrical fixed inner exit member positioned substantially co-axial with the outer exit member and forming a substantially annular space between the inner and outer exit members.

10. An extrusion die apparatus as recited in claim 8 wherein the radial channels in the radial plane are curved within the radial plane.

11. An apparatus according to claim 8, further comprising a multiplicity of additional substantially radial channels, the additional radial channels being grouped into sets of channels, each set of channels lying substantially in one of a plurality of parallel radial planes, the parallel radial planes being spaced apart along the length of the inner member, each radial plane containing one or more radial channels.

12. An apparatus according to claim 11 wherein the multiplicity of additional substantially radial channels are curved within their respective radial planes.

13. An apparatus according to claim 8 wherein a gap region having a shape is defined between the internal first surface of the outer member and the external second surface of the inner member and wherein the inner member includes a shaft adjacent to a head, the head of the inner member being located downstream of the shaft along the extrusion direction and such that the shaft and the head can move relative to one another in a direction along the extrusion axis thus varying the shape of the gap region between the inner member and the outer member in an area of the orientation control section whereby the orientation of the at least one of reinforcing fibers and reinforcing molecules is thus adjusted.

14. An apparatus according to claim 1 wherein the radial channels are curved.

15. An apparatus according to claim 3 wherein the mandrel is rotatable about the extrusion axis.

16. An apparatus according to claim 3 wherein a gap region having a shape is defined between an internal first surface of the nozzle and an external second surface of the mandrel and wherein the mandrel includes a shaft adjacent to a head, the head of the mandrel being located downstream of the shaft along the extrusion direction and such that the shaft and the head can move relative to one another in a direction along the extrusion axis thus varying the shape of the gap region between the mandrel and the nozzle in an area of the orientation control section whereby the orientation of the at least one of reinforcing fibers and reinforcing molecules is thus adjusted.

* * * * *